United States Patent
Nishibori

(12) 
(10) Patent No.: US 6,419,792 B1
(45) Date of Patent: Jul. 16, 2002

(54) PHOTOCATALYTIC PULP COMPOSITION

(75) Inventor: Sadao Nishibori, Tokyo (JP)

(73) Assignee: Ein Kohsan Co., Ltd., Tokyo (JP)

( * ) Notice: Subject to any disclaimer, the term of this patent is extended or adjusted under 35 U.S.C. 154(b) by 0 days.

(21) Appl. No.: 09/389,476

(22) Filed: Sep. 3, 1999

(30) Foreign Application Priority Data

Aug. 20, 1999 (JP) .......................................... 11-234790

(51) Int. Cl.$^7$ .............................................. D21H 17/63
(52) U.S. Cl. ................ 162/181.4; 162/158; 162/164.1; 502/242; 502/402
(58) Field of Search ................................ 162/135, 146, 162/158, 168.1, 174, 175, 177, 181.1, 181.4, 169, 164.1, 290; 502/242, 402

(56) References Cited

U.S. PATENT DOCUMENTS

| | | | |
|---|---|---|---|
| 4,255,526 A | 3/1981 | Yukuta et al. | ............... 521/108 |
| 5,972,831 A | * 10/1999 | Poncelet et al. | ............. 502/304 |

FOREIGN PATENT DOCUMENTS

| | | |
|---|---|---|
| EP | 0252204 | 1/1987 |
| WO | WO 87/05346 | 9/1987 |

OTHER PUBLICATIONS

Patent Abstracts of Japan, Pub. No. 06–285890; Oct. 11, 1994.
Patent Abstracts of Japan, Pub. No. 06–107502; Apr. 19, 1994.
Patent Abstracts of Japan, Pub. No. 05–163418; Jun. 29, 1993.
JP6206844 A; 19870323; DW198717 007pp.
Patent Abstracts of Japan, Pub. No. 08–173805; Jul. 9, 1996.
Patent Abstracts of Japan, Pub. No. 11–172112; Jun. 20, 1999.
Patent Abstracts of Japan, Pub. No. 10–025696; Jan. 27, 1998.

* cited by examiner

Primary Examiner—Dean T. Nguyen
(74) Attorney, Agent, or Firm—Schlesinger, Arkwright & Garvey LLP

(57) ABSTRACT

There is provided a photocatalytic pulp composition characterized in that 40 to 95 wt % of a pulp and/or a paper having the water content of 3 wt % or less, the average fiber diameter of 5 to 300 μm and the average fiber length of 0.7 to 70 mm is blended with 5 to 60 wt % of titanium oxide. A photocatalytic pulp composition is provided in which 25 to 100 wt % of a thermoplastic resin is blended relative to the total weight of titanium oxide with a pulp and/or a paper blended at the above ratio.

29 Claims, 5 Drawing Sheets

Surface

Cross section

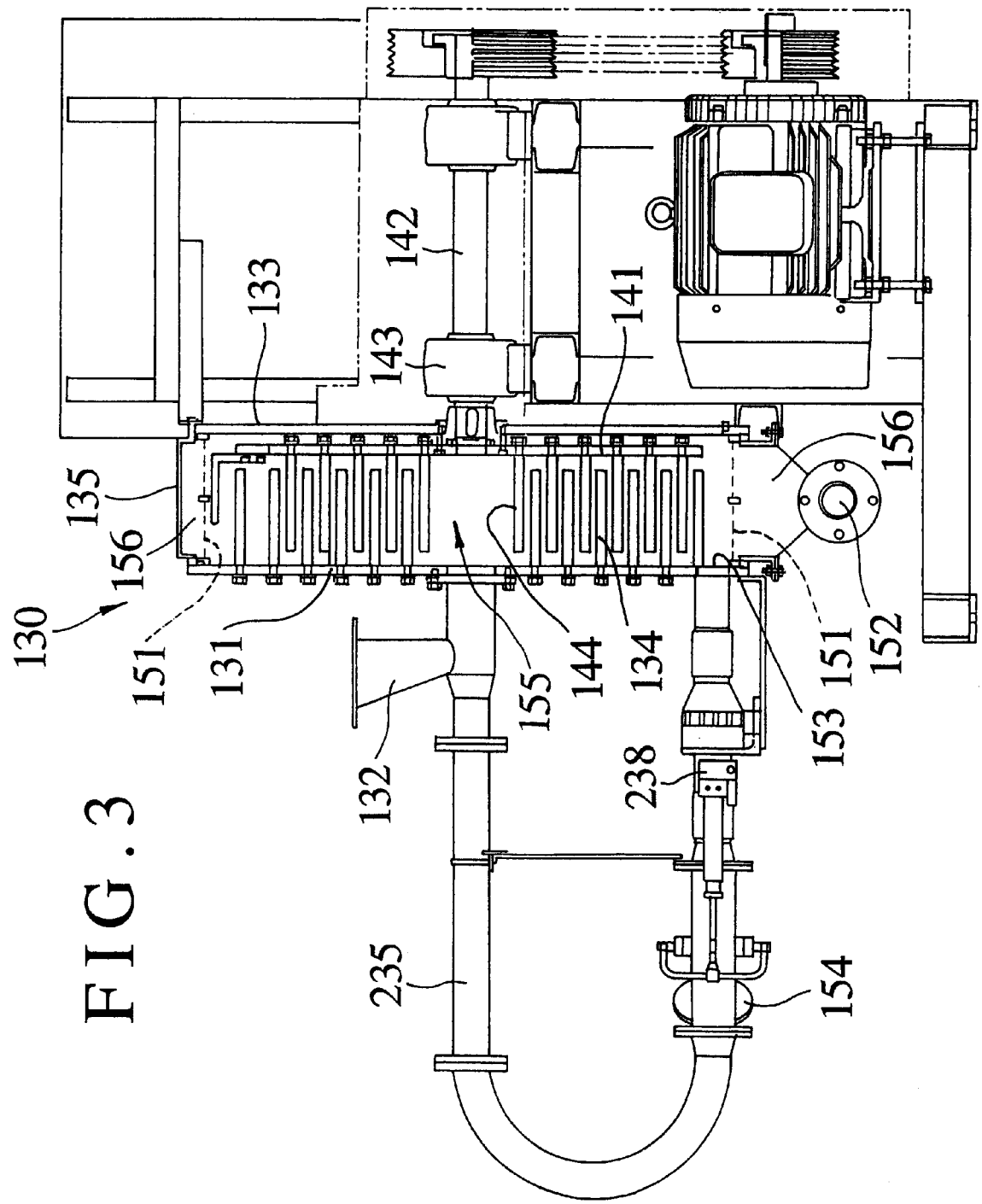

PHOTOCATALYTIC PULP COMPOSITION

BACKGROUND OF THE INVENTION

1. Field of the Invention

The present invention relates to a photocatalytic pulp composition, a molding material which is mainly a pulp and/or paper and wastepaper, preferably from newspaper, and which has the photocatalytic activity, and a process and an apparatus for producing the same, a photocatalytic pulp foam using the photocatalytic pulp composition and a process for producing the same, a molded article such as a paper and the like having the photocatalytic pulp composition and a process for producing a molded photocatalytic pulp foam using the photocatalytic pulp foam and, more particularly, a photocatalytic composition which can be widely applied to various uses as furniture, building material and general packaging material such as filter material, paper sliding screen, paper for a sliding screen, wall paper, blind, panel, lamp shade, bed sheet, curtain, carpet, sofa and sheet, and flexible composite packaging material, as well as a particular packaging material for, example, antimold use, interior material for a car, facing material on an electric product for house use, and a raw material for and an article of various molded articles such as daily necessaries, and film, sheet, adhesive or adhesive resin layer, various coating agents or coating resin membrane, or paint or paint resin membrane, which has the deodorizing and antibacterial properties and which can improve or effectively exert the photocatalytic properties of titanium oxide, that is, the properties of titanium oxide of being activated by an ultraviolet ray and oxidatively degrading organic materials, ammonia, NOx, SOx and the like such as to provide deodorizing and antibacterial properties, by adsorbing titanium oxide onto pulp and/or paper or adding titanium oxide thereto, preferably laminating wastepaper of newspaper which went through a DIP step, for example, in a paper making step, or laminating wastepaper obtained by separately drying wastepaper of newspapers via an adhesive, and articles for various uses.

2. Description of the Prior Art

The above kind of titanium oxide has been hitherto used as a deodorizing filter or provided as a coating agent, and used in order to obtain the stainproofing or the antibacterial properties of surfaces by forming a film by coating on an objective material and drying it.

However, these previous articles lead to the disadvantageous results that the reacting rate is slow or the completion of the reaction is remarkably late, in the case of articles obtained by coating titanium oxide or inserting and fixing titanium oxide into gaps between fibers.

A main object of the present invention is to provide a photocatalytic pulp composition having the antibacterial, antimold, stainproofing and bad smell degrading, deodorizing and harmful material oxidation degrading effects, and which is widely used for a packaging material, building material, filtering material and the like, a photocatalytic pulp composition which is effectively used for air treatment, water treatment and soil treatment, and at the same time to provide a photocatalytic pulp composition having the photocatalytic properties which can improve the photocatalytic activity effects themselves of titanium oxide and a process and an apparatus for producing the same, a photocatalytic pulp foam using the photocatalytic pulp composition and a process for producing the same, and a process for producing a molded photocatalytic pulp using the photocatalytic pulp composition or a molded photocatalytic pulp foam using the photocatalytic pulp foam.

SUMMARY OF THE INVENTION

In order to accomplish the above object, a photocatalytic pulp composition of the present invention is characterized in that 40 to 95 wt %, preferably 80 to 50 wt % of pulp and/or paper having the water content of 3 wt % or less, the average fiber diameter of 5 to 300 μm and the average fiber length of 0.1 to 70 mm is incorporated into 5 to 60 wt %, preferably 20 to 50 wt % of titanium oxide.

Next, another photocatalytic pulp composition of the present invention can be formed by incorporating 25 to 100 wt % of a thermoplastic resin therein relative to the total weight of titanium oxide, a pulp and/or paper which are blended at the above ratio.

By incorporating a thermoplastic resin therein, it becomes easy to heat-mold the above photocatalytic pulp composition and to mold it into the desired shape, and the thermoplastic resin serves as a binder and, thus, the binding between fibers becomes firmer.

Next, a photocatalytic pulp foam is characterized in that a foaming agent comprising a) a solution of 0.01 to 0.07 wt % of a surfactant relative to 100 wt % of the diluting water, b-1) not greater than 10 wt % of an amino acid and/or a protein such as gelatin comprising a keratinous substance obtained from a feather hair relative to 100 wt % of the diluting water, and/or b-2) a bubble-like adhesive of 10 wt % of an adhesive relative to 5 to 50 wt % of the diluting water is incorporated into the photocatalytic pulp composition in which the pulp and/or the paper are incorporated into titanium oxide.

Even when the adhesive is added thereto, in the case where the diluting water is 50 wt % or more, the curing is difficult. In the case where the diluting water is 5 wt % or less, the viscosity is too high to expand.

Next, in the case where the protein (keratin or gelatin) is 10 wt % or more, even when a temperature of the diluting water is 50° C. or higher, the dissolution does not occur. When the surfactant is 0.01 wt % or less, the effects are not obtained, while when the surfactant is incorporated at 0.07 wt % or more, there is no difference in the effects.

A process for producing the photocatalytic composition comprises a step of stirring a mixture obtained by incorporating the above pulp and/or paper into titanium oxide at the above ratio by subjecting stirring impact force thereto, to cause shearing heat generation and, thereby, highly drying the above mixture with this shearing heat generation to reduce the water content to 3 wt % or less, a step of swelling the pulp and/or the paper upon drying to form a three dimensional entangled fibers, and a treatment step of pushing the titanium oxide towards the fiber surface of the pulp and/or the paper by the stirring impact force to fix it.

Next, a process for producing of the photocatalytic pulp foam comprises a treatment step of pushing the above titanium oxide of a mixture obtained by incorporating the pulp and/or the paper into titanium oxide at the above ratio towards the fiber surface of the above pulp and/or the paper according to the above step, to fix it to obtain a photocatalytic pulp composition, a foaming step of preparing an foaming agent, and a step of mixing this foaming agent into the above photocatalytic pulp composition and preferably mixing it to stir and, thereafter, pressing it to obtain a foam having the diameter of the particle size of 9μ to 10 mm.

A molded photocatalytic pulp and a molded photocatalytic pulp foam can be prepared by pouring the above photocatalytic pulp composition or the photocatalytic pulp foam into a mold and, as necessary, compressing it into the desired shape, and heating to dry or drying the photocatalytic pulp foam.

Upon this, by molding by inserting an electric bulb or a fluorescent lamp as an infrared light source into this molded foam by the known means or surrounding or molding while leaving the source part with split-cavity mold, the photocatalytic activity effects are obtained at a place where the light source is not present, such as a storehouse and a refrigerator.

A blending ratio of a foaming agent in the photocatalytic pulp foam is such that a ratio of the foaming agent obtained by mixing into
a) a solution containing 0.01 to 0.07 wt % of a surfactant relative to 100 wt % of the diluting water,
b-1) 0.05 to 2 wt % or less of gelatin and/or an amino acid relative to 100 wt % of the diluting water, and
b-2) 20 to 200 wt % of a bubble-like adhesive relative to 100 wt % of the diluting water, or
b-3) 20 to 200 wt % of a bubble-like adhesive relative to 100 wt % of the diluting water
relative to the above pulp composition is 1:0.5 to 4, respectively. Alternatively,
a) the diluting water and the surfactant are blended as described above,
b-1) 0.1 to 10 wt % or less of gelatin and/or an amino acid is mixed with 100 wt % of the above diluting water so that a ratio of the foaming agent and the pulp composition is 1:0.5 to 3.

Furthermore, a molded photocatalytic pulp as a laminated photocatalytic pulp paper can be obtained by laminating a virgin pulp or wastepaper pulp manufactured from a wastepaper of newspaper, for example, after a DIP step on the above photocatalytic pulp composition.

The process for producing it is to make a paper from a virgin pulp or a wastepaper in a step of making paper after the above treatment step of pushing and fixing titanium oxide to form the laminated photocatalytic pulp paper.

Alternatively, in the case where the pulp is a paperboard-like dry pulp, the process includes a splitting or disaggregating step by which the above dry pulp is treated, that is, the dry pulp is cut into a plurality of sections to be treated, and the impact grinding force is applied to the formed individual sections to obtain pulp fibers which are ground and wool-likely aggregated, have approximately the same length of fiber-like raw pulp and have no fiber hair even with the grinding.

The above splitting and disaggregating step is accomplished by an apparatus equipped with a fixation side impact grinding means which is positioned on a fixed circular disc, the center of which is penetrated through a port supplying small cut sections and in which respective fixing pins are successively provided on a plurality of rotating loci, a mobile side impact grinding means positioned on a mobile circular disc which is opposite to the fixation circular disc and is rotatingly drivably provided and in which respective mobile pins different from the fixation pins are successively provided on a plurality of a rotating loci, and a take-out means for taking out fibrous sections to be treated which are ground and wool-likely aggregated into a take-out port.

Being configured as above, the present invention has the effect as described below.

Thus, according to the present invention, a photocatalytic pulp composition having the antibacterial, antimold, stain-proofing and stain and bad smell degrading, deodorizing, and harmful substance oxidation degrading effects which can remarkably advance the reaction rate and the completion of the reaction, which can improve the photocatalytic activity effect of titanium oxide, and which can be applied to many wide uses such as for packaging material, building material such as wall paper, filter material is provided. In addition, a photocatalytic pulp composition and its foam which are effectively used in the air treatment, the water treatment and the soil treatment can be provided.

BRIEF DESCRIPTION OF DRAWINGS

The objects and advantages of the invention will become apparent from the following detailed description of the preferred embodiments provided hereof in connection with the accompanying drawings wherein like numerals denote like elements and in which:

FIG. 1(A) is magnification ×200 and FIG. 1(B) magnification ×750;

FIG. 2(A) indicates the surface, magnification ×750, and FIG.(B) indicates the cross-section, magnification ×200;

FIG. 3 is a partial cross-sectional view schematically showing the outlined construction of an impact grinding apparatus used in a step for splitting and disaggregating the present paperboard-like dry pulp;

DETAILED DESCRIPTION OF THE PREFERRED EMBODIMENT

Figure 1A:
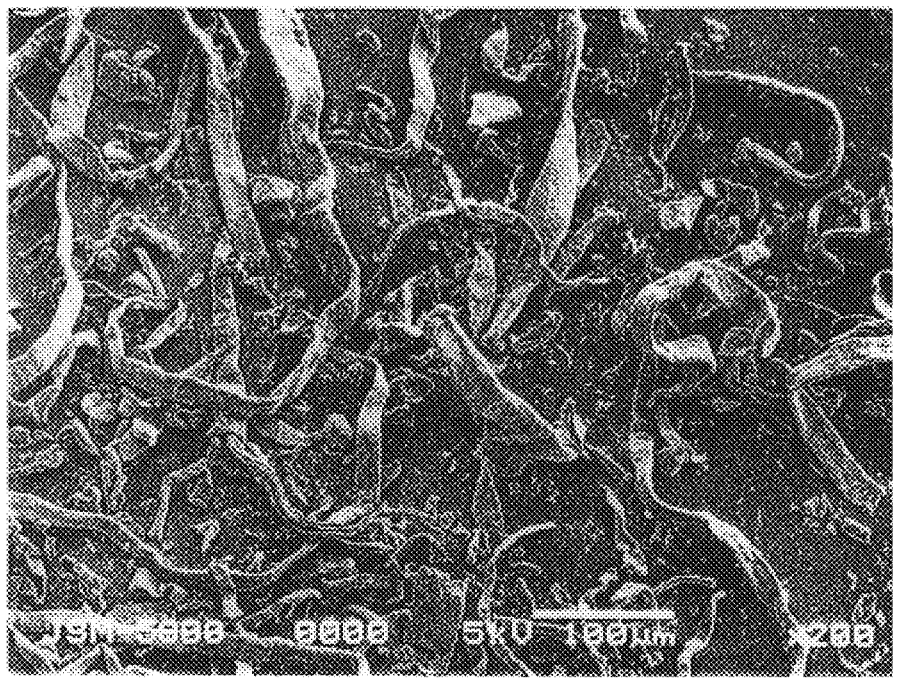
FIGS. 1(A) and (B) show the surface of the photocatalytic pulp composition of an embodiment of the present invention measured by a scanning microscope.

Example (1) for Preparing a Photocatalytic Pulp Composition.

In this Example, a pulp and/or a paper used as a raw material includes not only a so-called virgin pulp in a paper making step but also a wastepaper pulp or a pulp obtained by mixingboth at 1:1, and the paper includes a normal paper and widely a wastepaper such as wastepaper of newspaper.

Wastepaper is ground with a cutter mill having 10 mm×10 mm screen and, thereafter, treated and since it contains a large amount of printing ink is preferably bleached or colored with a DIP treatment in a paper making step like a wastepaper to be laminated as described below.

And the average fiber diameter is 5 to 300 μm and the average fiber length is 0.1 to 70 mm, and the bulk specific gravity is 0.005 to 0.04 in the case of paper fiber and 0.24 in the case of virgin pulp and/or paper. 80 wt % of it (upon this, the pulp and/or paper contains about 8 wt % of water) and 20 wt % of titanium oxide are incorporated.

The average fiber diameter of the pulp and/or the paper of 5 to 300 μm, and the average fiber length of 0.1 to 70 mm means a particle size of 50% by weight in accumulative weight percent of the pulp and/or the paper.

In the case where paper, paper is grinding-treated with a crusher and passed through a screen having 10 mm mesh.

In addition, printing ink in wastepaper has no problem upon treatment except that a product is slightly colored.

In the case of paperboard-like dry pulp, the dry pulp is cut into a plurality of sections, and the impact grinding force is applied to the formed individual sections to obtain pulp fibers which are ground and wool-likely aggregated, have approximately the same length as that of fibrous raw pulp and have no fiber hair even with the grinding. Such paperboard-like dry pulp after the splitting and disaggregating step is used.

An impact grinding means used in this step is referred to as "separator" for convenience in this Example.

In FIGS. 3 to 6, a separator 130 is opened in a port 132 for supplying respective small sections to be treated in the center of a fixed circular disc 131. A fixed end plate 133 is opposite to the fixed circular disc 131 separated by a treating space 155. Respective circumferential edges of the fixed end plate 133 are fixed to the fixed circular disc 131 with a circumferential side plate 135. A mobile circular disc 141 is rotated and driven by a rotating transverse axis 142 in the interior of the treating space 155. The rotating transverse axis is supported pivotally by each bearing 143, 143. The rotating transverse axis 142 is rotated and driven by a rotating driving means such as a motor and the like. And, on the fixed circular disc 131, a plurality (6 in this Example) of respective pins 134 are provided on rotating loci a1 to a6 (relative to a mobile plate 141) (FIG. 5) on a concentric circle, and 16-24-32-36-40-42 of respective fixing pins 134 are successively provided from the center of the fixed circular disc 131 on a concentric circle towards the circumferential edge in this Example. On the other hand, on the mobile circular disc 141, a plurality (6 in this Example) of mobile pins 144 which are different from the respective fixing pins 134 and positioned alternately on rotating loci b1 to b6 are successively (4-4-4-4-4-6) provided on the concentric circle from the center of the mobile circular disc 141 towards the circumferential edge, and which are positioned so that the splitting and disaggregating action is obtained between respective fixed and mobile pins 134, 144 by the impact grinding force.

Further, a screen 151 having the predetermined mesh in which small pores having the desired diameter are formed by punching is circumferentially provided on the circumferential side of a mobile circular disc 141 between the circumferential side plate 135 separated by a discharge port 156, and a discharge port 152 is provided below a discharge space 156. A blower 157 is communicated with the discharge port 152 in a separator 130 as shown in FIG. 6.

And, the discharge port 152 is communicated with a recovery tank 250 via a discharge tube 239 provided with a blower 157.

In addition, the screen 151 has a mesh diameter of about 0.8 mm to 2.0 mm, depending upon the rotation number of the mobile pins used as described below. Further, a take-out port 153 is formed on a lower part in the interior of the screen 151 of the treating space 155 (FIG. 3). The grinding force which is applied to small sections to be treated is weakened by increasing the clearance between the respective fixed and mobile pins 134, 144 and the grinding force is strengthened by decreasing the clearance. A blower 157 which sucks air in a separator 130 is communicated with the take-out port 153 as shown in FIG. 6, and may be communicated with the supply port 132 via this blower 157.

Figure 6:
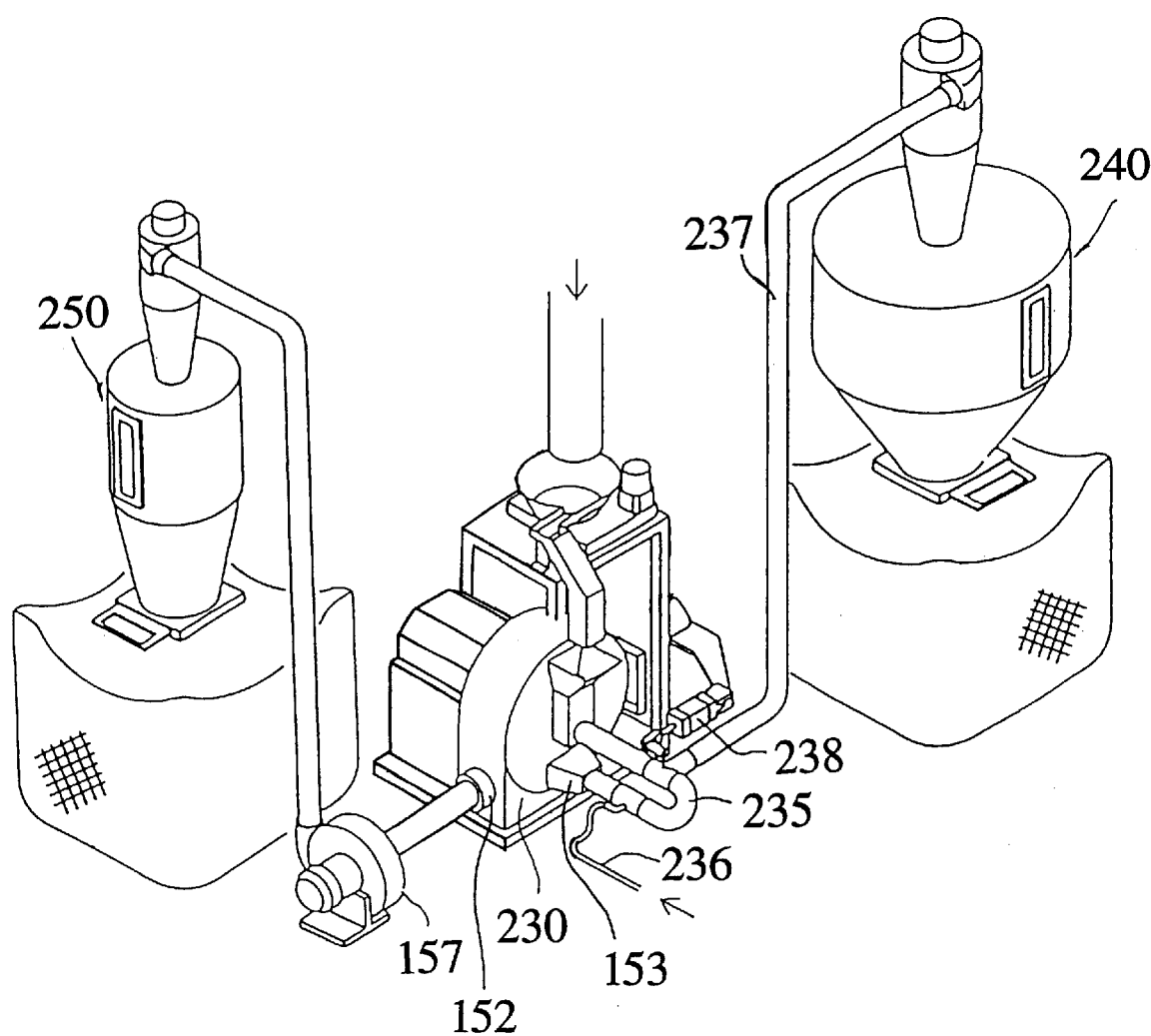

In addition, as shown in FIGS. 3 and 6, the following construction may be taken: A take-out port 153 and a treating space 155 are communicated via a communicating tube 235. Compressed air which is circulated in a treating space 155 from a take-out port 153 and which is from a compressed air supplying source (not shown) is introduced in a communicating tube 235 via a piping 236, and ground pulp fibers and alien substances which are discharged from a take-out port 153 are circulated again in a treating space 155 in the separator 130.

Alternatively, a ramificating tube 237 communicating with a tank 240 for recovering the pulp fibers, or the pulp fibers and alien substances is provided by branching a supply port side of the communication tube 235. A two-directional valve 238 which can be appropriately switched every set time, for example, with a timer circuit is provided at a ramificating point of this ramificating tube 237. The downstream side of the communicating tube 235 is closed with a magnetic valve and the ramificating tube 237 side is opened. The pulp fibers which remain in a screen 151 are sucked and recovered in a recovery tank 240 via a ramificating tube 237. Alternatively, a magnetic valve which opens and closes the ramificating tube 237 and a magnetic valve which opens and closes the downstream side of the ramificating tube 235 are provided, and these two magnetic valves may be opened and closed alternately (FIG. 6).

By rotating the rotating transverse axis 142 with a rotating driving means such as a motor or the like to rotate the mobile circular disc 141 and supplying respective small sections to be treated in the supply port 132, the respective small sections to be treated are loosened into smaller fibers between respective fixed and mobile pins 134, 144 by the impact grinding force in the center of the treating space 155 and, on the other hand, the diameter of the alien substances becomes about 2 to 6 mm in an indefinite manner by the impact grinding force. That is, respective small sections to be treated are beaten and ground or pulverized into small pieces with the impact by respective fixed and mobile pins 133 and 144, and since the bending action is repeatedly applied to the respective small sections to be treated, the finely-divided paperboard is separated from small sections to be treated. Like this, the pulp fibers and alien substances which constitute the small sections to be treated are separated every its kind, respectively. The boardpaper is loosened into fibers and the alien substances are ground into fine pieces, respectively.

During this period, by an air stream produced by the compressed air which is supplied in the treating space 155 by the centrifugal force by rotation of the mobile circular disc 141 or the suction force of the blower 157 or via a piping 236. The separated and fiberized paper layer and pulp fibers or fiberized paper layer and a small amount of alien substances gradually approach the circumferential side of the circumferentially provided separator 130 of the screen 151 in the mixed state. Thereafter, the fiberized pulp is passed through the screen 151 which is formed into meshes having the diameter of about 0.8 to 2 mm and discharged into the discharge space 156 and, thereafter, sucked towards the outside via the discharge port 152 and the blower 157, and recovered in a recovery tank 250 via the discharge tube 239. On the other hand, the thin substance pieces and a small amount of pulp fibers which are aggregated into a wool can not pass through the screen 151 and thereby remain in the treating space. When the recovery of the pulp fibers is completed, the alien substances which remain in the interior of the treating space 155 are discharged outwards from the take-out port 153.

The discharged substances are recovered into the recovery tank 240 via the ramificating tube 237 by closing the downstream side of the communicating tube 235 and opening the ramificating tube 237 side with the two-directional magnetic valve 238 of the ramificating tube 237 which is branched on the supply port side of the communicating tube 23 and which is communicated with the tank 240 for recovering the pulp fibers to suck the alien substances which remain in the screen 151.

In FIG. 3, the connection of the communication tube 235 to the ramificating tube 237 is carried out via the flange 154 provided on the piping in which the upstream side and the take-out 153 side of the communication tube 235 are branched (towards a rear of a paper plane in FIG. 3).

The pulp fibers thus recovered are transferred to a next step.

Titanium oxide is effective when its particle size is smaller and, for example, the X-ray diameter of 7 to 50 nm can be used.

The pulp and/or the paper and titanium oxide, or these materials together with synthetic fibers are placed in a mixer, and the water content of titanium oxide and the pulp and/or the paper is adjusted to 3 wt %, preferably to 1 wt % or less by the shearing heat released by the shearing force based on the stirring impact force by a stirring impact wing rotating at a high speed in the mixer to raise the temperature to about 120° C. In this step, water is evaporated from the pulp and/or the paper to dry it and at the same time the pulp and/or the paper in the case of paper undergo the grinding action by the impact force, is swelled at the same time with the drying, the fibers become hairy and aggregated into the loosened wool to obtain three-dimensionally entangled fibers. Thereafter, titanium oxide is attached to or inserted in to be fixed to the fiber surface and the interior of the fibers by the stirring impact force of the stirring impact wing or the pushing external force accompanied with the shearing force.

The synthetic fiber is preferable when the average fiber length is 1 to 100 mm, the average diameter is 10 to 40 $\mu$m, and a melting point is 120° C. or higher.

In addition, since virgin pulp has usually the water content of 100 wt % or more, it is preferably pre-dried with the mixer or a known drier to the water content of 10 wt % or less before titanium oxide is mixed.

In this step, the attachment and fixation of titanium oxide are completed to form "photocatalytic pulp composition".

In this step, the pulp and/or the paper in the raw material become a large lump, are aggregated while loosened into dissociated wool without the mutual firm entanglement of the individual fibers and, in this sense, the three-dimensionally entangled fibers are formed and the individual pulp and/or paper are formed in such a form that titanium oxide is attached to all the surface of the fiber of the pulp and/or the paper. Since these individual fibers are a loosened wool-like lump which are aggregated from paper, there is no adhesive properties between the simple pulp and/or the paper and the lump itself has a high bulk specific gravity. Therefore, the photocatalytic pulp composition formed by this step is a better material as a photocatalytic pulp composition which can be made into a paper in various known paper making steps.

The above step is described in more detail. Since the water content of the pulp and/or the paper is 3 wt % or less, the interface between titanium oxide and the pulp and/or the paper is lost, titanium oxide is dispersed into the pulp and/or the paper at a uniform density, titanium oxide becomes easy to be adsorbed onto or attach to the pulp and/or the paper and at the same time the pulp and/or the paper is mixed and dispersed while completely surrounding the circumference of the pulp and/or the paper.

As such, the present photocatalytic pulp composition can be used as a raw material to form a paper by various paper making methods.

In addition, plastic fiber or glue, starch, wax or a resin adhesive such as vinyl acetate and acryl system can be mixed therein in a paper making step to prepare a molded photocatalytic pulp composition.

A photocatalytic pulp paper was prepared using the above pulp composition having the photocatalytic activity.

As Examples and Comparative Examples of a photocatalytic pulp composition using a photocatalytic pulp composition, titanium oxide ST-01 (manufactured by Ishiharatechno Company) having the X ray diameter of 7 nm, the titanium oxide content of 90 wt % or more and the specific area of 300 $m'^2/g$ was used and treated with the stirring impact force by a stirring impact wing rotating at a high speed in the mixer.

An internal temperature of a mixer: 120° C.

[Photocatalytic Pulp Composition: Example 1]

Loosened wool-like pulp: 2 kg (50 wt %), the water content: 10 wt %,

Titanium oxide: 2 kg (50 wt %), water content after treatment: 0.5 wt %

About 2.5 kg of a plate-like dry pulp is treated in the splitting and disaggregating step to obtain about 2.0 kg of loosened wool-like pulp, and about 2.0 kg titanium oxide is fixed to obtain about 3.90 kg of a photocatalytic pulp composition.

[Photocatalytic Pulp Composition; Example 2] [FIG. 1 and FIG. 2]

Loosened wool-like pulp: 2 kg (80 wt %), water content: 10 wt %

Titanium oxide: 0.5 kg (20 wt %)

The water content after treatment: 0.6 wt %

Paper fiber: 2 kg (80 wt %), water content: 10 wt %; treated in the splitting and disaggregating step.

Titanium oxide: 0.5 kg (20 wt %)

This was treated via a fixation treating step to obtain about 2.3 kg of a photocatalytic pulp composition.

Figure 2A:
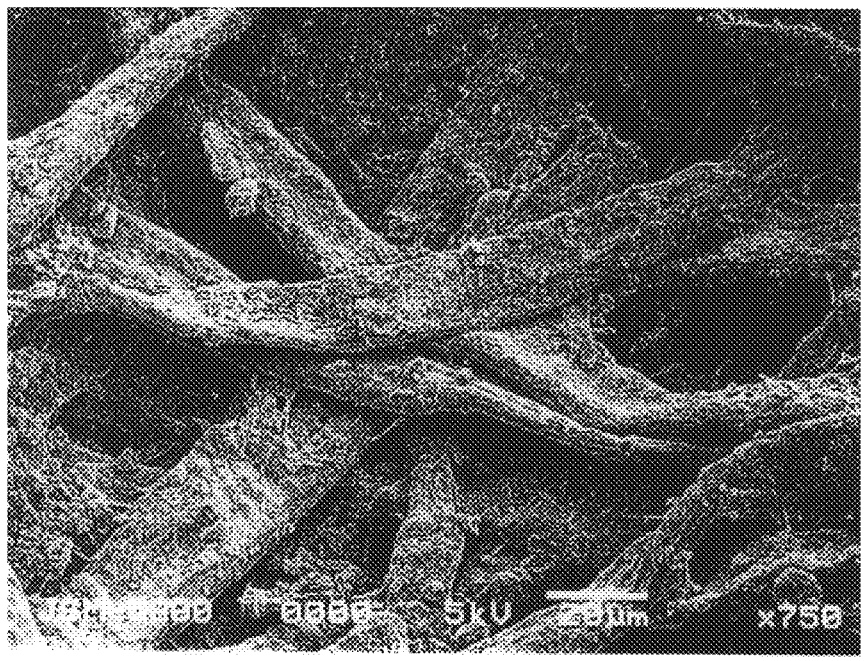
FIGS. 2(A) and (B) show the surface and the cross-section, respectively of the photocatalytic pulp composition of an embodiment of the present invention measured by a scanning microscope.
Figure 2B:
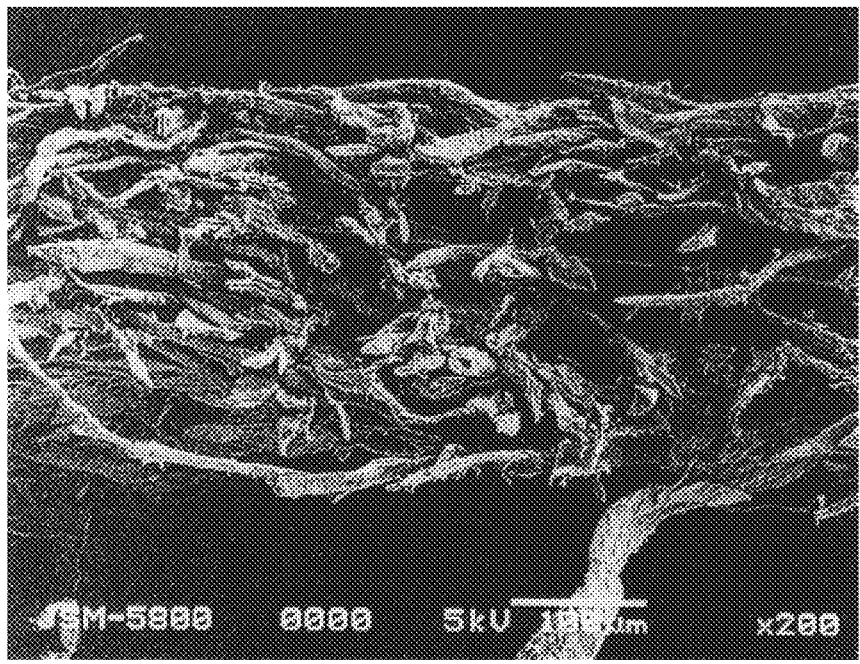
Figure 4:
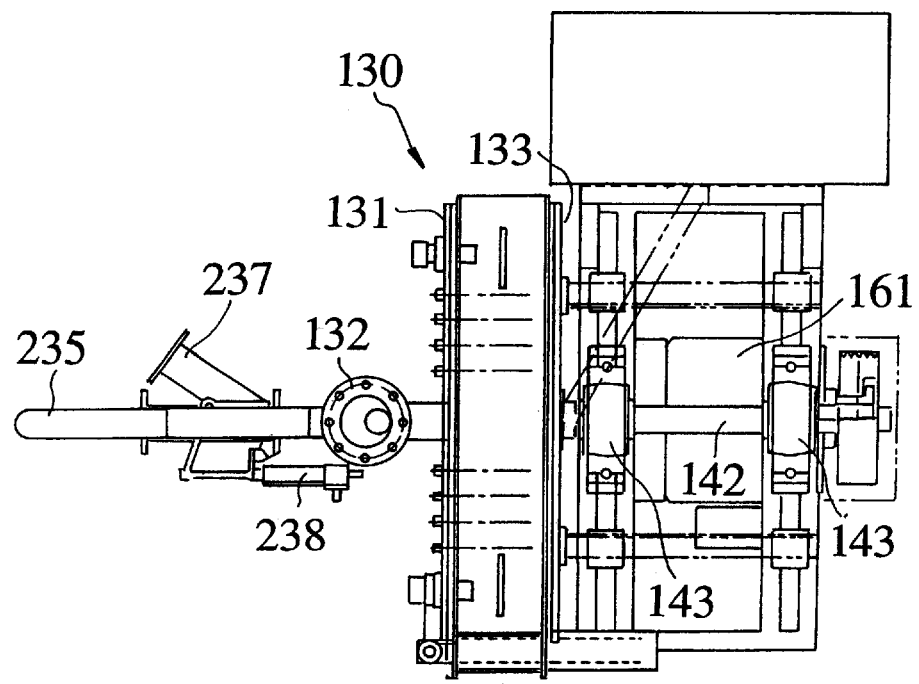
FIG. 4 is a plan view of FIG. 3.
Figure 5:
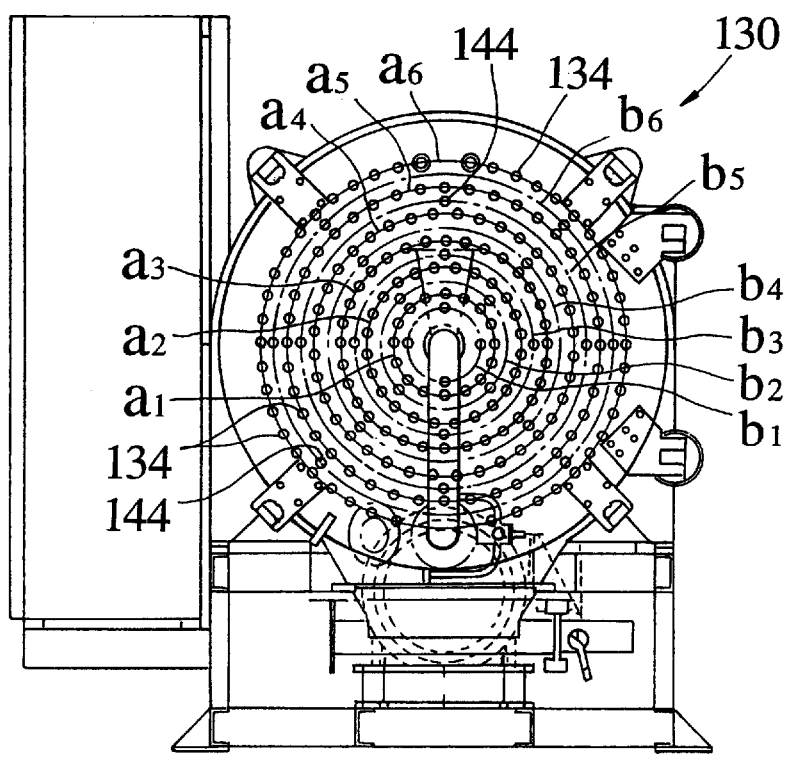
FIG. 5 is a schematic front view for explaining the impact grinding action in the splitting and disaggregating action of the apparatus of FIG. 3.; and, FIG. 6 is an outlined view showing example of the impact grinding means used in the splitting and disaggregating step of the present invention.

The photocatalytic pulp compositions obtained in the above Examples 1 and 2 were used to make a paper according to the same step as that of manual Japanese paper making step (for convenience, referred to as Test Examples 1 and 2). 500 ml of water was added to 20 g of the photocatalytic pulp composition, stirred for 15 minutes. 2 liter of water was added thereto to make a paper which was dried naturally. The thickness of a paper was 0.25 mm (FIG. 2)

Using the photocatalytic pulp composition obtained in the above [Example 1], the composition was diluted to the pulp concentration of 8 wt % to perform the beating treatment with a beater for 1 hour.

On the other hand, a beaten pulp raw material such as virgin pulp including a Japanese paper, herein for example, a wastepaper pulp comprising newspaper wastepaper after a DIP step (de-inking treatment) was diluted with water to the pulp concentration of 8 wt %, beat-treated for 1 hours, then a wet sheet of a pulp comprising a photocatalytic pulp and a wastepaper of newspaper is made into a paper using a paper making machine in the known paper making step. A photocatalytic pulp (50 g/$m^2$) and a pulp comprising a wastepaper of newspaper (10 g/$m'^2$) after beating treatment were made into a paper using a wire paper machine and a cylinder paper machine, respectively, which were overlapped, transferred to a press part and further dried to make a paper.

By the foregoing, a transparent, air-permeable white substrate layer was laminated on a photocatalytic pulp layer (Example 3).

Example 4

The photocatalytic pulp composition obtained in Example 2 and a wastepaper of newspaper were made into a paper as in Example 1.

Beater treatment time: 1 hour
Concentration of photocatalytic pulp: 8 wt %
Concentration of a wastepaper of newspaper pulp: 8 wt %
Basis weight: Total 60 g/m$^2$
Photocatalytic pulp layer: 50 g/m$^2$
Newspaper wastepaper pulp layer: 10 g/m$^2$
[Photocatalytic Pulp+Paper; Comparative Example 1]

Paper fibers 2 kg (80 wt %) and titanium oxide 0.5 kg (20 wt %) were diluted to the pulp concentration of 8 wt % with a beater without using a mixer in the above embodiment and Example, to make a paper. Basis weight: Total 50 g/m$^2$ The test results of the above Test Examples 1 and 2 and Comparative Example 1 are shown below.
Test conditions:
Concentration of added acetaldehyde: about 820 ppm
Light intensity: about 1 mW/cm$^2$
Reaction vessel: 1 liter
Photocatalytic Pulp Composition and other Comparative Example
Sample size: 8×8 cm
Thickness: 0.25 mm

TABLE 1

|  | Photocatalyst $Co_2$ initial producing speed ppm/min | $Co_2$ production rate at 1 h (%) | $Co_2$ production rate at 2 h (%) | Acetaldehyde initial vanishing speed (ppm/min) |
| --- | --- | --- | --- | --- |
| Test Ex. 1 | 29.8 | 79 | 100 | 18.9 |
| Test Ex. 2 | 24.0 | 68 | 100 | 17.5 |
| Comp. Ex. 1 | 11.0 | 38 | 47 | 7.4 |

The photocatalytic $Co_2$ initial producing rate is obtained by the following formula:
(Apparent $Co_2$ initial producing rate)—(light control $Co_2$ producing rate)

Acetaldehyde initial vanishing rate is the vanishing rate at 30 min. after photo-irradiating.

The production rate (%) at 1 h or 2 h is a ratio of the production relative to theoretical value and was calculated by only photocatalyst portion.

The initial acetaldehyde vanishing rate (%) is concentration at 1 h/initial concentration×100.

The photocatalyst+pulp pape, a paper of Comparative Example 1 has the extremely low photocatalytic activity and the acetaldehyde vanishing rate is slow.

To the contrary, the photocatalytic pulp composition Test Example 1 shows 100% of $Co_2$ production rate at 2 h like Test Example 2, and it can be seen that after the concentration of acetaldehyde is decreased, the sufficient reaction occurs.

It was seen that simple mixing of titanium oxide cannot afford the effects and the present invention extremely can improve the photocatalytic activity.

Figure 1B:
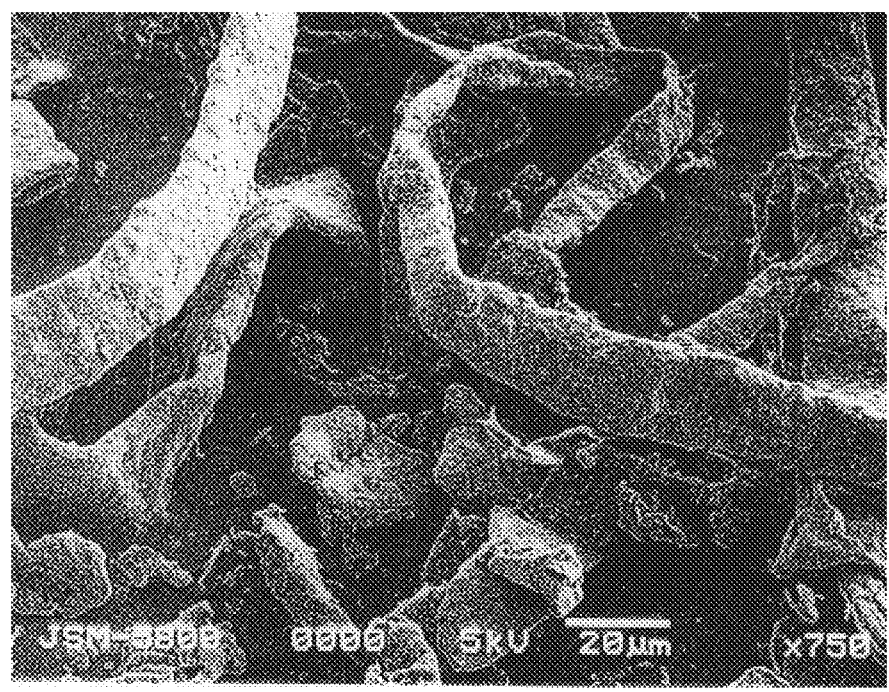

FIGS. 1 (A) and (B) and FIGS. 2 (A) and (B) show scanning microscopic photographs of the photocatalytic pulp composition and photocatalytic pulp composition (Test Example 2) of Example 2, respectively. It can be seen that titanium oxide is attached and connected to the external face of a pulp raw material and the state where titanium oxide is attached is maintained on the external face of a pulp and also in the interior of a paper even according to a paper making method using water. This is also clear from the fact that little titanium oxide is dissolved in water which was added at a point of stirring in a paper making experiment of Test Example.

In addition, the above Examples 3 and 4 afforded similar results to those of Test Examples 1 and 2 (Examples 1 and 2).

[Example (2) for Preparing a Photocatalytic Pulp Composition]

In this Example, a ratio of blending titanium oxide, a pulp and/or a paper which forms a photocatalytic pulp composition are the same as those of the above Example (1) for preparation.

In addition, the same titanium oxide, the pulp and/or the paper as those of Preparation Example (1) can be used as a raw material.

In this Example, as in the Preparation Example (1), titanium oxide and a pulp and/or a paper are blended and at the same time 25 to 100 wt % of a thermoplastic resin is added to the total weight of the titanium oxide and pulp and/or paper to form a photocatalytic pulp composition.

The photocatalytic pulp composition is formed, and a recycled paper comprising wastepaper pulp obtained by DIP-treating a wastepaper of newspaper can be laminated on the composition.

For this thermoplastic resin, various resins can be used. In addition, thermoplastic resin in powder, particle and sheet forms can be used. Preferably, a thermoplastic resin having a particle size of 1 mm or less in the case of a powdery or particulate thermoplastic resin, or a thermoplastic resin having the thickness of 1 mm or less in the case of a sheet-like thermoplastic resin is ground into pieces having the side of 10 mm or less to use it.

When the produced photocatalytic composition is heated to form a molded photocatalytic pulp, if heated at a high temperature, the pulp in this photocatalytic pulp composition is burnt by this heat in some cases and, therefore, it is preferable that a thermoplastic resin having a lower melting point such as PE (LLD linear low density) and vinyl acetate is used as compared with a thermoplastic resin having a relatively high melting point such as polyester, polycarbon and the like.

A pulp and/or a paper and a thermoplastic resin which constitute the photocatalytic pulp are not required to be placed in a mixer as a separate raw material and, for example, a composite film having a paper layer laminated with a thermoplastic resin film and which is used for a milk pack is ground into small pieces having the side of around 10 mm and, thereafter, the pieces may be placed in the mixer as described above. In this case, a paper layer of the composite film becomes a pulp fiber which constitutes a photocatalytic pulp composition and a thermoplastic resin layer becomes a thermoplastic resin which constitutes the formed photocatalytic pulp composition to be formed. Therefore, an amount of titanium oxide to be blended is determined taking a ratio of the pulp component relative to the thermoplastic resin component contained in a composite film into consideration and at the same time, as necessary, a thermoplastic resin and/or a pulp and/or a paper are added so as to adjust the ratio of respective raw materials to the aforementioned ratio.

After the pulp and/or the paper and titanium oxide and the thermoplastic resin are placed in a mixer, the mixer is actuated to produce the shearing heat by the shearing force based on the stirring impact force provided by the stirring impact wing which rotates at a high speed in the mixer and a temperature is raised to about 120° C. to adjust the water content of the pulp and/or the paper to 3 wt %, preferably 1 wt % or less. In this step, water is evaporated from the pulp and/or the paper to dry it and, at the same time, the pulp and/or the paper in the case of a paper undergoes the grinding action by the impact force to become fibrous and, further, which is swelled accompanied with the drying. Fibers are scuffed up and aggregated into a loosened wool to form three-dimensionally entangled fibers. Thereafter, titanium oxide is attached to or inserted into the surface of the fibers or also the interior of the fibers by the pushing external force accompanied with the stirring impact force or the shearing force by the stirring impact wing.

In addition, at the same time, at least part of the thermoplastic resin placed into the mixer also undergoes the grinding action, and ground into small pieces which are attached to or inserted into the surface of the fibers and the interior of the fibers by the pushing force accompanied with the stirring impact force or the shearing force by the stirring impact wing like the aforementioned titanium oxide.

When a composite film such as a milk pack is used as the aforementioned pulp and/or the paper and thermoplastic resin, small sections of the composite film placed into the mixer are separated into a thermoplastic resin layer and a paper layer by the stirring impact force provided by the shearing impact wing and the separated paper layer is ground by the stirring impact force and loosened into fibers as described above for the paper.

In addition, at least part of the thermoplastic resin layer is also ground into small pieces by the stirring impact force and attached to or inserted into the surface of the pulp fibers and the interior of the pulp fibers like the aforementioned separately placed thermoplastic resin.

In addition, thermoplastic resin is not required to melt by the heat upon stirring with the mixer as long as it is attached to or inserted into the pulp fibers.

The present photocatalytic pulp composition can be easily formed into a molded photocatalytic pulp such as a press sheet and the like, for example, by pressing under heating. In addition, since the molded article which was formed by the method binds firmly between pulp fibers because a thermoplastic resin attached to or inserted into the surface or the interior of the pulp fibers serves as a binder, it becomes a molded article such as a tough press sheet and the like.

A pulp composition having the photocatalytic activity obtained by the aforementioned Preparation Example was used to manufacture a molded, photocatalytic pulp composition (press sheet).

Example and Comparative Example of a Photocatalytic Pulp Paper Using a Photocatalytic Pulp Composition As an Example, a thermoplastic resin PE [Urdozex 4030P (powder): Mitsui Petroleum chemichal Industries Co., Ltd.] was used and the other raw materials are the same as those of the aforementioned Example 2.

[Photocatalytic Pulp Composition; Example 5: Test Example 3]

Paper fiber: 2 kg (80 wt %), water content: 10 wt %
Titanium oxide: 0.5 kg (20 wt %)
Thermoplastic resin: PE 1.5 kg (Paper fiber+60 wt % relative to the total weight of titanium oxide)
Water content after treatment: 0.5 wt %

The above raw material is placed into a mixer and stirred, and its temperature is raised to about 120° C. to adjust the water content of the paper fiber to 3 wt %, preferably 1 wt % or less.

2.27 g of the photocatalytic pulp composition obtained as described above was spread 8×8 cm, nipped with a Teflon sheet, and heated in a thermostatic chamber at 150° C. for 2 hours while applying a load of 1 kg to form a molded photocatalytic pulp (press sheet) having the basis weight of 50 g/m$^2$ which was used as a sample (Test Example 3).

Example 6

The molded press sheet of the aforementioned Example 5 and a wastepaper pulp comprising a wastepaper of newspaper after a DIP step (deinking treatment) were made into a paper to dry. The basis weight 10 g/m$^2$ was laminated on one side via an adhesive with a hot press, which was used as a sample (Example 6).

Beater treatment time: 1 hour
Concentration of photocatalytic pulp: 8 wt %
The photocatalytic pulp was not treated with a beater.
Basis weight: Total 60 g/m$^2$
Photocatalytic pulp layer: 50 g/m$^2$
Newspaper wastepaper pulp layer: 10 g/m$^2$

[Comparative Example 2 (The Aforementioned Photocatalytic Pulp Paper; Test Example 2)]

Paper fiber: 2 kg (80 wt %) water content: 10 wt %
Titanium oxide: 0.5 kg (20 wt %)
Water content after treatment: 0.6 wt %

The photocatalytic pulp composition obtained in the aforementioned Example 2 was used and made into a paper according to the same step as that of manual Japanese paper step (Unfoamed: the aforementioned Test Example 2).

500 ml of water was added to 20 g of the photocatalytic pulp composition, stirred for 15 minutes, 2 liter of water was further added and made into a paper which was naturally dried. Weight: 1.42 g and the paper thickness: 0.25 mm were Comparative Example 2.

Comparative Example 3 (Example 7)

The photocatalytic pulp composition obtained in the aforementioned Example 2 was used and made into a paper according to the same step of the Comparative Example 1 (basis weight, total 50 g/m$^2$), wastepaper pulp comprising a wastepaper of newspaper after a DIP step (deinking step) and this molded photocatalytic pulp were made into a paper to dry (basis weight, total 60 g/m$^2$), which was laminated one side via an adhesive with a hot press.

Beater treatment time: 1 hour
Concentration of photocatalytic pulp: 8 wt %
Concentration of wastepaper of newspaper: 8 wt %
Basis weight: Total 60 g/m$^2$
Photocatalytic pulp layer: 50 g/m$^2$
Newspaper wastepaper pulp layer: 10 g/m$^2$ The results comparing the molded photocatalytic pulp of the aforementioned Example 5 and Comparative Example 2 under the following conditions are shown in Table 2.

Experimental Conditions

Concentration of added acetaldehyde: about 820 ppm
Light intensity: about 1 mmW/cm$^2$
Reaction vessel: 1 liter Photocatalytic Pulp Paper and other Comparative Example
Sample size: 8×8 cm
Basis weight: Total 60 g/m$^2$

TABLE 2

|  | Photocatalyst $Co_2$ initial producing rate ppm/min | $Co_2$ production rate at 1 h (%) | $Co_2$ production rate at 2 h (%) | Acetaldehyde initial vanishing rate (ppm/min.) | $Co_2$ 100% production time time (h) |
|---|---|---|---|---|---|
| Test Ex. 3 | 24.3 | 70 | 100 | 16.2 | 2 |
| Com. Ex. 2 | 24.0 | 68 | 100 | 17.5 | 2 |

It was confirmed that the molded photocatalytic pulp (press sheet; Test Example 3) formed from the photocatalytic pulp composition manufactured in Example 5 has approximately the same properties as those of the photocatalytic pulp paper (Comparative Example 2) obtained in the aforementioned Test Example 2.

Therefore, it was revealed that the molded photocatalytic pulp of the aforementioned Test Example 3 has the effect of improving the photocatalytic activity efficiency which cannot be obtained by simply mixing titanium oxide.

In addition, since $CO_2$ production rate at 2 hours is 100%, the sufficient reaction occurs even after the concentration of acetaldehyde is decreased.

In addition, Example 6 (Test Example 3) and Comparative Example 3 (Example 7) afforded similar results to those of Example 5 and Comparative Example 2, respectively.

[Preparation Example of a Photocatalytic Pulp Foam]

The present photocatalytic foam is obtained by expanding the photocatalytic pulp composition manufactured by the aforementioned Preparation Example (1). Since Preparation Example of the photocatalytic pulp composition is the same as Preparation Example (1), a step of expanding the photocatalytic pulp composition with a foaming agent is explained below.

A foaming agent used herein comprises water for dilution, a surfactant, an adhesive and an amino acid or gelatin.

The surfactant to be used is not limited to but includes a non-ionic ether type such as polyoxyethylene lauryl ether, polyoxyethylenoley ether and polyethylene glycol nonyl phenyl ether, amino ether type and ether ester type, and an anionic surfactant such as a salt of resinic acid, lignin sulfonic acid, ABS and a salt of lauryl alcohol sulfate ester.

Gelatin particle used herein is preferably obtained by hydrolyzing a protein derived from collagen such as commercially available gelatin and the like with an enzyme acid or an alkali to obtain a polypeptide which is used as a raw material and this polypeptide is ground according to a dry grinding method such as a jet mill and the like and, for example, gelatin having the average molecular weight of 8,500 or less is used as a raw material for grinding.

Particularly preferably, a crude powder of gelatin having the average molecular weight of 1,000 to 8,500 obtained by hydrolyzing a commercially available gelatin with an enzyme, an acid or an alkali and spraying in hot air at approximately 120° C. through a nozzle to dry is used.

Then, an amino acid particle used in this Example is explained.

An amino acid (crude powder) used herein is positioned on an extension line of a gelatin particle, is extremely resembles a gelatin particle, and is not limited to but includes amino acids having the average molecular weight of 100 to 200 and having no polypeptide linkage obtained by hydrolyzing a protein contained in defatted soybean, wheat protein, peanut oil bath, rapeseed grounds, cotton seed grounds, corn, cow's milk, white of an egg, fish meat and the like, keratin contained in hair, wool and the like with an enzyme, an acid or an alkali.

The aforementioned keratin is contained in a feather, and hair and nail of animals and they can be used alone or a combination of them. A nail is desirably subjected to a grinding step as a pretreatment. Therefore, it is preferred that a feather is used as a raw material because the step can be omitted. In order to convert a feather into a slurry, water is added to the feather, which is boiled with an indirect heat-type heat exchanger at 70 to 120° C. for 3 to 5 hours under normal pressure or under pressure. An amount of water to be added is not limited to specific ones as long as it is an amount required to convert the feather into a slurry. The amount may be 50 to 80 parts (by weight) of water relative to 100 parts of the feather.

The feather thus boiled is filtered together with water.

For example, the feather which became a slurry and a boiling and aging solution are placed into a filtering apparatus having a cloth of mesh 100 m as a filter and 60 parts of an aqueous β-keratin solution relative to 100 parts of a feather is recovered. The remaining 40 parts are discarded.

Then, the amino acid particle can be used by blending into a resin together with the aforementioned gelatin particle or in place of the aforementioned gelatin particle. The amino acid particle used herein can be prepared by grinding the crude powder of an amino acid having the average molecular weight of 100 to 200 obtained by hydrolyzing various proteins with an enzyme, an acid or an alkali. For example, in the ground amino acid particle obtained by placing a crude powder of an amino acid together with dimethylformamide into a ball mill, and compared with a gelatin particle obtained by the similar grinding to a crude powder of an amino acid, the excessively grounded particle and ungrounded particle are slightly present together and the amino acid particles are in the state where they are made homogenous in a uniform particle size, which causes no practical problem. In addition, the amino acid particle obtained by grinding while classifying the crude powder of amino acid using a dry grinding means such as a jet mill and the like is further made homogenous into a uniform particle size and is practically suitable.

Therefore, the composition of an amino acid in the crude powder of an amino acid used herein is different depending upon a raw material from which the crude powder of an amino acid is obtained but an amino acid particle obtained by grinding the crude powder of an amino acid having any composition of an amino acid can be practically used.

Next, the aforementioned adhesive can be formed of glue and starch which are used as the aforementioned binder and, in addition, a resin normally used for an adhesive and, if desired, may be a layer containing an additive such as an adhesiveness subjecting agent, a softening agent, a filler, an aging preventing agent, a cross-linking agent and the like.

As to resin, for example, there are a natural rubber; a synthetic rubber such as styrene-butadiene system, polyisobutylene system, isoprene system; acrylic resin, for example, methyl (meth)acrylate, ethyl (methyl)acrylate, butyl (meth)acrylate, 2-ethylhexyl (meth)acrylate; olefin resin, for example, polyethylene, polypropylene; silicone resin, for example, siloxane-trichlorosilane, alkoxysilane; urethane resin, for example, polyesterpolyol, polycarbonate, polyetherpolyol, polyalkylenepolyol and the like. Preferably, an emulsion adhesive, for example, an urethane emulsion or an acrylic emulsion adhesive, for example, a polyester polyurethane aqueous dispersion two-part curing type adhesive is used.

For example, an urethane emulsion, an urethane emulsion (trade name WA351, manufactured by Dainichi Seikakogyo (K.K.)) to which a cross-linking aid such as the known melamine resin and the like or a curing agent such as isocyanate, or an additive for stabilizing the mechanical strength is used.

The blending ratio of a foaming agent in the photocatalytic pulp foam is as follows:

TABLE 3

Foaming agent mixing ratio

| Foaming agent | Dilution water | Surfactant | Amino acid/ gelatin | Adhesive |
|---|---|---|---|---|
| A | 100 | 0.01 ~ 0.07 | 0.1 ~ 10 | |
| B | 100 | 0.01 ~ 0.07 | | 20 ~ 200 |
| C | 100 | 0.01 ~ .07 | 0.05 ~ 2 | 20 ~ 200 |

The mixing ratio of a photocatalytic pulp composition and the foaming agent is as follows relative to 100 (wt %) of the photocatalytic pulp composition.

TABLE 4

| Kind of foaming agent | Foaming agent (wt %) |
|---|---|
| A | 50 ~ 300 |
| B | 50 ~ 400 |
| C | 50 ~ 400 |

Then, these foaming agents, preferably together with a photocatalytic pulp composition are mixed and stirred at the aforementioned blending ratio with a blending machine. This mixing and stirring is carried out in order to mix air bubbles into the foaming agent to convert into a flowing bubble of the predetermined particle shape.

By converting into a bubble-like foam, the surface area is increased, the photocatalytic activity effect is enhanced, and the concentration of a foaming agent can be adjusted to mold it thinly and uniformly. Further, the long-term holding of the bubbles can be maintained by an additive such as gelatin and molding as a foam is easy. In addition, mutual adhesion of pulp fibers can be performed firmly in place of an adhesive.

An aqueous solution of this mixed and stirred bubble layer scum is immediately placed in a foaming machine comprising a pressure vessel of gauze pressure of 8 kg/cm$^2$. The pressure of the foaming machine is controlled to the gauze pressure of 8 kg/cm$^2$, and a discharge port of a tank is equipped with a foaming part which accommodates ceramic beads having the diameter of 0.5 mm tightly under pressure, and the foaming machine produces approximately uniform bubbles having the particle diameter of 9 mm and having the suitable viscosity through the discharge port by pressurizing for about 30 seconds.

In addition, after this foaming step, or at the same time with preparation of the aforementioned photocatalytic pulp composition, a synthetic fiber having the average fiber length of 1 to 100 mm, the average diameter of 10 to 40 $\mu$m and a melting point of 120° C. or higher may be blended, mixed and dispersed.

The blending ratio of the synthetic fiber is desirably maximum 9 relative to 1 of the aforementioned photocatalytic pulp composition.

[Molded Photocatalytic Pulp Foam; Example 8]

Although the aforementioned photocatalytic pulp foam and a molded photocatalytic pulp herein can be formed by various molding methods, for example, transfer, rotation molding, calendar, lining processing, slash, dip molding, lamination molding and the like, a molded photocatalytic pulp or a molded photocatalytic pulp foam can be obtained in any form including a paper-like foam for use as a filter and the like by coating with various coating methods, or laminating, or spraying with a spraying gun, on the surface of a timber, a paper, a nonwoven cloth or other substrate or on a release paper, or pouring into a mold for casting molding, or molding by various molding methods such as molding by omitting or alleviating the heating in air-press forming or compression molding, then as necessary, drying or heating to dry. Here, an embodiment using spraying coating with a spray gun is shown.

Photocatalytic Pulp Composition (The Aforementioned Example 2)

Paper fiber: 2 kg (80 wt %), water content: 10 wt %

Titanium oxide: 0.5 kg (20 wt %)

Water content after treatment: 0.6 wt %

After the aforementioned photocatalytic pulp composition was mixed with the following foaming agent:

Surfactant: 1.25 kg

Dilution water: 2.5 kg

Gelatin: 2.5 kg, to expand, which was coated on a wooden plate at the thickness of 5 mm with a spray gun, dried at 100° C. for 3 hours to obtain a sheet-like molded foam having the weight of 0.27 g and the thickness of 1 mm.

(Test Example 4)

[Comparative Example 3 (The Aforementioned Photocatalytic Pulp Paper; Test Example 2)]

Paper fiber: 2 kg (80 wt %), water content: 10 wt %

Titanium oxide: 0.5 kg (20 wt %)

Water content after treatment: 0.6 wt %

The photocatalytic pulp composition obtained in the aforementioned Example 2 was used and made into a paper according to the same step as manual paper making step (unfoamed: Test Example 2).

500 ml of water was added to 20 g of a photocatalytic pulp composition. The mixture was stirred for 15 minutes, 2 liter of water was further added and made into a paper to naturally dry. Weight: 1.42 g and the thickness: 0.25 mm was Comparative Example 3.

[Comparative Example 4]

In Comparative Example 4, a glass plate was dipped into a solution obtained by adding a solvent to 10 wt % of a silica binder and 10 wt % of titanium oxide to obtain a dried sample of 50 wt % of a silica binder and 50 wt % of titanium oxide.

The test results of the aforementioned Test Example and Comparative Example are shown below.

Experimental Conditions

Concentration of added acetaldehyde: about 820 ppm

Light intensity: about 1 mW/cm$^2$

Reaction vessel: 1 liter

Photocatalytic Pulp Composition Paper and other Comparative Example

Sample size: 8×8 cm Thickness: 0.25 mm

TABLE 5

| | Photocatalyst $Co_2$ initial producing rate ppm/min | $Co_2$ production rate at 1 h (%) | $Co_2$ production rate at 2 h (%) | Acetaldehyde initial vanishing rate (ppm/min.) | $Co_2$ 100% production time time (h) |
|---|---|---|---|---|---|
| Test Ex. 4 | 7.0 | 32 | 46 | 6.2 | 7 |
| Com. Ex. 3 | 24.0 | 68 | 100 | 17.5 | 2 |
| Com. Ex. 4 | 11.5 | | 50 | 10.4 | 20 |

A Test Example 4: photocatalytic pulp foam has not greater than one fifth of the weight of the composition except for a foaming agent component as compared with that of Comparative Example 3 (Photocatalytic pulp paper: Test Example 2) and, thus, respective values in the test results should be not greater than one fifth as compared with Comparative Example 3 but the molded photocatalytic pulp foam shows respective values not smaller than one fifth as compared with Comparative Example 3.

By using the aforementioned molded photocatalytic pulp or the molded photocatalytic pulp foam as an inner, external or intermediate layer or as a laminating material such as a core material or a substrate, the pulp or the pulp foam can be made into a laminated article in which a normal paper, synthetic paper, plastic film, or nonwoven cloth are laminated in two or three layers. In this case, by using, as a core material or a substrate, materials having excellent transparency such as normal paper, synthetic paper, nonwoven cloth or woven cloth, which has the transparency or has many openings, nonwoven cloth having low density, woven cloth having a crude weave pattern, or transparent film, not only when the molded photocatalytic pulp or the photocatalytic pulp foam is arranged in the state where it is positioned at the light source side and can be directly exposed to the light but also when the photocatalytic pulp is not positioned directly on the light source side such as when the molded photocatalytic pulp or the photocatalytic pulp foam is held between the core materials or the substrates, the molded photocatalytic pulp or the photocatalytic pulp foam is irradiated with the light which is passed through the core material or the substrate and suitably exerts the photocatalytic properties of titanium oxide and, at the same time, by using a core material or a substrate equipped with openings and having the air permeability, the molded photocatalytic pulp can be easily used as a filter and the like.

The aforementioned molded and foamed articles are excellent in air permeability and best for use as a filter. In addition, in the foamed articles, drying of an adhesive is promoted upon molding. In addition, in the case of a molded article obtained by heating to mold a photocatalytic pulp composition with a thermoplastic resin blended therein, the thermoplastic resin serves as a binder and, thereby, binding between pulp fibers becomes firm and a tough press sheet and the like can be obtained.

Now, the invention has been described. Thus, the broadest claims that follow are not directed to a machine that is configured in a specific way. Instead, the broadest claims are intended to protect the heart or essence of this breakthrough invention.

This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A photocatalytic pulp composition, comprising:
   a) pulp fibers 40 to 95 wt % having a water content of 3 wt % or less, said pulp fibers having average fiber diameter of 5 to 300 $\mu$m and average fiber length of 0.7 mm to 70 mm, said pulp fibers forming a three-dimensional entangled mass; and
   b) titanium oxide 5 to 60 wt % incorporated into said mass and adsorbed onto said pulp fibers.

2. The photocatalytic pulp composition as in claim 1, wherein:
   a) thermoplastic resin 25 to 100 wt % relative to the total weight of said titanium oxide is incorporated into said pulp fibers.

3. The photocatalytic pulp composition as in claim 1, wherein 80 to 50 wt % of said pulp fibers is blended in 20 to 50 wt % of titanium oxide.

4. The photocatalytic pulp composition as in claim 1, wherein:
   a) a synthetic fiber having average fiber length of 1 to 100 mm, average diameter of 10 to 40 $\mu$m and a melting point of 120° C. or higher is blended into 5 to 60 wt % of said titanium oxide and 40 to 95 wt % of said pulp fibers at a maximum ratio of 1:9.

5. A photocatalytic pulp composition as in claim 1, wherein said titanium oxide has particle size of 7 to 50 nm.

6. A photocatalytic pulp composition as in claim 1, wherein said pulp fibers are made from wastepaper.

7. A photocatalytic pulp composition as in claim 1, wherein said pulp fibers are made from virgin pulp and wastepaper pulp in 1:1 ratio.

8. A photocatalytic pulp composition, comprising:
   a) pulp fibers 40 to 95 wt % having a water content of 3 wt % or less, said pulp fibers having average fiber diameter of 5 to 300 $\mu$m and average fiber length of 0.1 to 70 mm, said pulp fibers forming a three-dimensional entangled mass;
   b) titanium oxide 5 to 60 wt % incorporated into said mass and adsorbed onto said pulp fibers; and
   c) thermoplastic resin 25 to 100 wt % relative to the total weight of said titanium oxide is incorporated into said pulp fibers.

9. The photocatalytic pulp composition as in claim 8, wherein 80 to 50 wt % of said pulp fibers is blended in 20 to 50 wt % of titanium oxide.

10. The photocatalytic pulp composition as in claim 8, wherein:
    a) a synthetic fiber having average fiber length of 1 to 100 mm, average diameter of 10 to 40 $\mu$m and a melting point of 120° C. or higher is blended into 5 to 60 wt % of said titanium oxide and 40 to 95 wt % of said pulp fibers at a maximum ratio of 1:9.

11. A photocatalytic pulp composition as in claim 8, wherein said titanium oxide has particle size of 7 to 50 nm.

12. A photocatalytic pulp composition as in claim 8, wherein said pulp fibers are made from wastepaper.

13. A photocatalytic pulp composition as in claim 8, wherein said pulp fibers are made from virgin pulp and wastepaper pulp in 1:1 ratio.

14. A photocatalytic pulp paper, comprising:
    a) paper using a photocatalytic pulp composition;
    b) said composition comprising pulp fibers 40 to 95 wt % having a content of 3 wt % or less, said pulp fibers having average fiber diameter of 5 to 300 $\mu$m and average fiber length of 0.7 mm to 70 mm, said pulp fibers forming a three-dimensional entangled mass; and c) titanium oxide 5 to 60 wt % incorporated into said mass and adsorbed onto said pulp fibers.

15. Papers in claim 14, wherein:
a) plastic fiber is incorporated in a paper making step.

16. Paper as in claim 14, wherein:
a) glue is incorporated in a paper making step.

17. Paper as in claim 14, wherein:
a) starch is incorporated in a paper making step.

18. Paper as in claim 14, wherein:
a) wax is incorporated in a paper making step.

19. Paper as in claim 14, wherein:
a) resin adhesive is incorporated in a paper making step.

20. Paper as in claim 19, wherein:
a) said resin adhesive includes vinyl acetate.

21. Paper as in claim 19, wherein:
a) said resin adhesive includes acrylate.

22. A photocatalytic pulp paper, comprising:
a) paper using a photocatalytic pulp composition;
b) pulp fibers 40 to 95 wt % having a water content of 3 wt % or less, said pulp fibers having average fiber diameter of 5 to 300 µm and average fiber length of 0.1 to 70 mm, said pulp fibers forming a three-dimensional entangled mass;
c) titanium oxide 5 to 60 wt % incorporated into said mass and adsorbed onto said pulp fibers; and
d) thermoplastic resin 25 to 100 wt % relative to the total weight of said titanium oxide is incorporated into said pulp fibers.

23. Paper as in claim 22, wherein:
a) plastic fiber is incorporated in a paper making step.

24. Paper as in claim 22, wherein:
a) glue is incorporated in a paper making step.

25. Paper as in claim 22, wherein:
a) starch is incorporated in a paper making step.

26. Paper as in claim 22, wherein:
a) wax is incorporated in a paper making step.

27. Paper as in claim 22, wherein:
a) resin adhesive is incorporated in a paper making step.

28. Paper as in claim 27, wherein:
a) said resin adhesive includes vinyl acetate.

29. Paper as in claim 27, wherein:
a) said resin adhesive includes acrylate.

* * * * *